US005557676A

United States Patent [19]
Nåslund et al.

[11] Patent Number: 5,557,676
[45] Date of Patent: Sep. 17, 1996

[54] AUTHENTICATION FOR ANALOG COMMUNICATION SYSTEMS

[75] Inventors: Jonas Nåslund, Upsala; Thomas Johansson, Stockholm; Johan Dahlström, Sollentuna, all of Sweden

[73] Assignee: Telefonaktiebolaget LM Ericsson, Stockholm, Sweden

[21] Appl. No.: 422,079

[22] Filed: Apr. 20, 1995

Related U.S. Application Data

[63] Continuation of Ser. No. 156,696, Nov. 24, 1993, abandoned.

[51] Int. Cl.$^6$ ........................................ H04K 1/00
[52] U.S. Cl. .................. 380/23; 380/75; 379/59; 379/63; 455/33.1
[58] Field of Search ................. 380/23, 24, 25, 380/48, 49, 50; 379/59, 63; 455/33.1, 33.2, 825.31; 340/825.33, 825.34, 825.35

[56] References Cited

U.S. PATENT DOCUMENTS

| | | | |
|---|---|---|---|
| 4,023,012 | 5/1977 | Ano et al. | 340/825.34 |
| 4,315,101 | 2/1982 | Atalla | 380/24 |
| 4,535,333 | 8/1985 | Twardowski | 340/825.31 |
| 4,814,741 | 3/1989 | Hongo et al. | 340/825.65 |
| 4,955,049 | 9/1990 | Ghisler | 379/58 |
| 4,958,368 | 9/1990 | Parker | 379/91 |
| 4,972,355 | 11/1990 | Mullins | 379/59 |
| 5,060,266 | 10/1991 | Dent | 380/49 |
| 5,091,942 | 2/1992 | Dent | 380/46 |
| 5,101,500 | 3/1992 | Marui | 455/33 |
| 5,237,612 | 8/1993 | Raith | 380/23 |
| 5,317,636 | 5/1994 | Vizcaino | 380/23 |
| 5,369,706 | 11/1994 | Latka | 380/23 |

FOREIGN PATENT DOCUMENTS

| | | |
|---|---|---|
| 1236532 | 5/1988 | Canada. |
| 1-272241 | 10/1989 | Japan. |
| WO91/01067 | 1/1991 | WIPO. |

OTHER PUBLICATIONS

PCT International Search Report; Date of mailing: Apr. 3, 1995.
"Cellular System Dual–Mode Mobile Station – Base Station Compatibility Standard" (Revised Letter – Ballot Version), *EIA/TIA – PN2759*, p. 87 (1992).
*SIS Addendum to NMT DOC 900–1*, four pages, (1988).
"Enhanced Authentication of Cellular Subscribers", Cellular Telephone Anti–Fraud Ad Hoc Committee TIA Mobile Communications Division, *ERU PRD MGMT–ENG H*, pp. 1–8 and Figures 1–3.

*Primary Examiner*—David C. Cain
*Attorney, Agent, or Firm*—Burns, Doane, Swecker & Mathis, L.L.P.

[57] ABSTRACT

A method and system for authenticating the identification of mobile stations during system access is disclosed. A modified electronic serial number, including an encoded COUNT value, sent by the mobile station is compared with a modified electronic serial number corresponding to that mobile station stored in system memory. In this way, fraudulent use can be deterred and detected without changing the specification of information to be transmitted over the air interface in existing radiocommunication systems.

27 Claims, 7 Drawing Sheets

AUTHENTICATION FOR ANALOG COMMUNICATION SYSTEMS

This application is a continuation of application No. 08/156,696, filed Nov. 24, 1993 now abandoned.

BACKGROUND

The present invention generally relates to methods and systems for authenticating the identification of mobile stations in radiocommunication systems and, more particularly to authentication methods and systems which can be used in analog radiocommunication systems and in radio local loop (RLL) systems.

In radiocommunication systems, mobile stations (including, for example, automobile-mounted and hand-portable units) are not connected permanently to a network but instead communicate wirelessly through a so-called "air interface" with a base station which is connected to an exchange. This feature, of course, provides the great flexibility which radiocommunication systems are known for, since a user can readily transport a portable unit without the restriction of being physically linked to a communication system. This same feature, however, also creates difficulties with respect to securing radiocommunication systems from fraudulent use.

For example, in ordinary wired telephone systems, the exchange can identify a particular subscriber to be billed for use of a telephone set by the communication line to which it is physically attached. Thus, fraudulent use of a subscriber's account typically involves a physical connection to be made to the subscriber's line which presents serious risk of discovery problems to a would-be fraudulent user.

Radiocommunication systems, on the other hand, pose no such connection problem for the would-be fraudulent user since these systems communicate over an air interface. Absent protection schemes, fraudulent users can access a subscriber's account by using the subscriber's identification code without fear of detection.

In the European GSM standard (Global System for Mobile Communication), the American EIA/TIA IS-54 standard and the Pacific Digital Cellular Standard radiocommunication systems, these problems are solved by using a challenge response method. According to the challenge response method, each mobile station is associated with a unique secret key that is stored both in the mobile station and in a database in the network. An algorithm, which is unique for the system, is stored in each mobile station and in desired network nodes. When authentication is requested, the network sends a challenge (random number) to the mobile station. Based on the received challenge and the stored secret key, the mobile station calculates a response using the algorithm which is then returned to the network. Simultaneously, the network calculates an "expected" response based on the same challenge and network stored secret key. The network then receives the mobile station's calculated response and compares the mobile station's calculated response with the network's calculated response. If a mismatch occurs, appropriate actions will take place, e.g., the access could be denied or a warning flag could be set.

The EIA/TIA IS-54 specification provides for a call number to be used in connection with authentication. However, the call number is transmitted over the air interface in a field of its own.

Adapting, for example, the Advanced Mobile Phone System (AMPS) and Total Access Communication System (TACS) to incorporate the challenge response method would result in many changes to these systems since the specification of the information to be transmitted over the air interface between a mobile station and the system during access would need to be changed. Naturally, such changes would be virtually impossible since the air interface for these systems has already been standardized.

SUMMARY

According to exemplary embodiments of the present invention, an object of authenticating the identification of a mobile station in a radiocommunication system can be achieved without requiring changes in the specification of the information to be transmitted by the mobile station during system access. The present invention provides good protection against would-be fraudulent users. Moreover, even if a fraudulent user succeeds in accessing the system, the present invention also makes it possible to detect such fraud. Exemplary embodiments can be used in, for example, cellular radiocommunication systems or in radio local loops (RLL systems). In RLL systems, authentication can be performed locally, e.g. in the base station, whereas in cellular systems authentication can be performed centrally, e.g. in the MSC.

The present invention provides for encrypting the Equipment Serial Number (ESN) with the count of performed calls, whereby this count is kept updated in both the mobile station and in the land system. The encrypted ESN can occupy the same data field in the air interface which conventionally would be occupied by the unencrypted ESN, thereby avoiding any change in the air interface.

BRIEF DESCRIPTION OF THE DRAWINGS

These and other objects, features, and advantages of the present invention will become more apparent upon reading the following detailed description in conjunction with the drawings in which.

DETAILED DESCRIPTION

Figure 1:
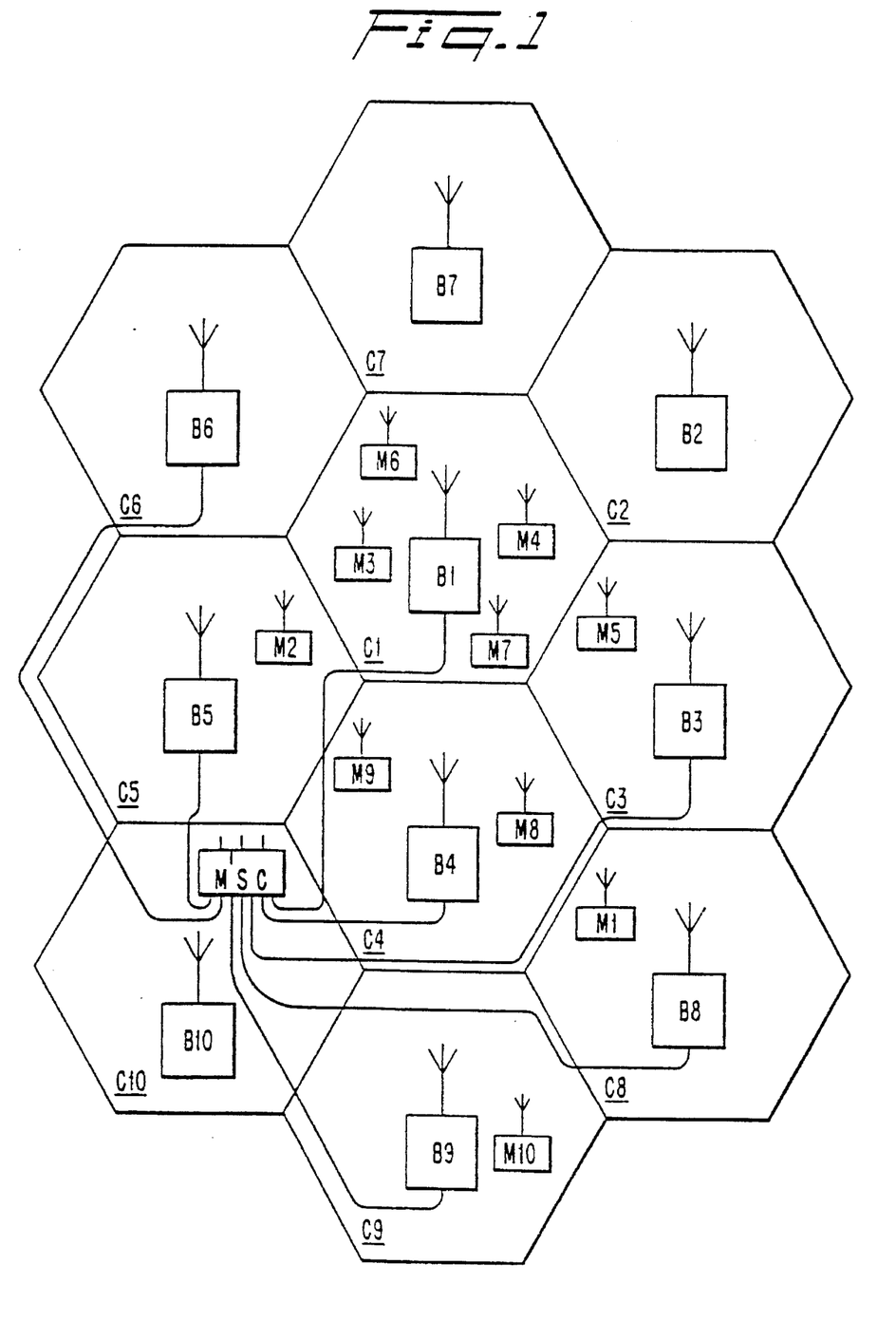
FIG. 1 illustrates base and mobile stations in an exemplary radiocommunication system.

FIG. 1 illustrates ten cells C1 to C10 in an exemplary cellular mobile radio system. For each cell C1 to C10 there is a corresponding base station, denoted B1 to B10. The base stations are situated in the center of the cells and have omnidirectional antennas. Ten mobile stations, M1–M10, are also shown. They may be automobile installed and powered by the vehicle's electric power system, or small, lightweight, battery-powered handportable stations. The mobile stations are moveable within a cell and from one cell to another. A mobile services switching center, abbreviated MSC, is connected to all the base stations by cables or any other fixed means, such as a radio link. Some of these cables are omitted in FIG. 1 for simplicity. The MSC is also connected by cables or links to a fixed public telephone network or a similar fixed communication network.

During operation the mobile stations will be in contact with the fixed part of the system by transmission of radio signals to, and reception of radio signals from, the different base stations. Telephone calls, data communication links or other communication paths can be set up between one mobile station and another mobile station in the system. Calls can also be set up to mobiles in another system or subscribers in the fixed network. For the purposes of this discussion, all of these situations are called connections irrespective of whether they originate or end in a mobile station.

The exemplary system of FIG. 1 is, of course, a simplification as normally the system will comprise more cells and base stations. There can, for example, be umbrella cells each covering an area also covered by a group of micro cells. Also the number of mobile stations will normally be much larger. Base stations located in the vicinity of the cell borders and with sector antennas are also common. Several other MSCs with connected base stations will also normally exist and the mobile stations are usually also free to communicate via these other MSCs.

As discussed above, conventional radiocommunication systems (e.g., AMPS, TACS, and NMT) authenticate mobile stations which access the system by comparing identification codes which are sent by the mobile station with those codes stored by the system. For example, two typical types of identification codes, which are frequently transmitted together by a mobile station to the system, are the Mobile Identity Number (MIN) and the Electronic Serial Number (ESN). The MIN identifies the subscription while the ESN identifies the actual hardware being used by the subscriber. Accordingly, it is expected that the MIN corresponding to a particular ESN will, due to new subscribers using old equipment, change over time.

Figure 2:
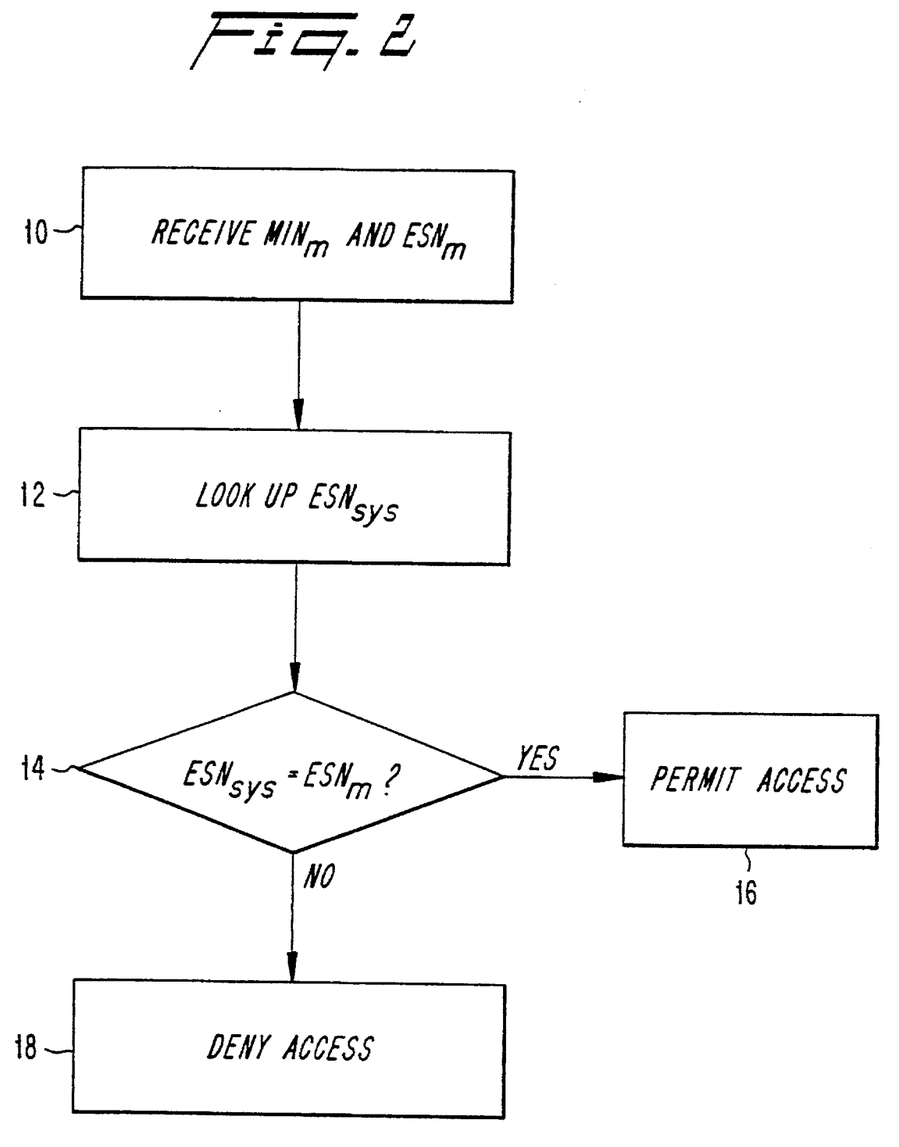
FIG. 2 is a flowchart illustrating a conventional authentication method.

According to a conventional authentication method illustrated by the flowchart of FIG. 2, the land system receives both an ESN and a MIN from the mobile station at block 10. These identification codes are designated $ESN_m$ and $MIN_m$ to indicate that they were received from the mobile. Next, at block 12, the land system retrieves the $ESN_{sys}$ which corresponds to $MIN_m$ from system memory. $ESN_{sys}$ is then compared with $ESN_m$ at block 14. If the two serial numbers are the same, the flow proceeds to block 16 and system access is permitted. Otherwise, system access is denied at block 18.

One drawback to this system is that it is relatively simple for a fraudulent user to assemble valid MIN/ESN combinations by eavesdropping on the air interface or from other sources. Since accesses according to this conventional system are presumed valid if the MIN and ESN received from the mobile correspond with those stored in system memory, all of the necessary information for fraudulent access can be obtained by electronic eavesdropping.

One way in which security can be improved is to introduce a COUNT variable into the authentication process. The COUNT variable can, for example, be eight bits long and be incremented by one bit in both the system and the mobile as a result of an event which is noticed by both the system and the mobile, e.g., the successful assignment of a traffic channel, a transmission of an origination/access to the system, a mobile station beginning to transmit on an assigned radio channel, registration, receiving and looping back of the SAT tone or an "on-hook" signal indicating call termination.

Those skilled in the art will readily appreciate that the selection of events which, when detected, increment the COUNT are merely exemplary. As long as both the mobile and the system know which events will increment the COUNT, the particular selection of such events can be made according to other system design considerations. In order to distinguish signalling interruption from fraud, the event can be chosen so that the COUNT is updated first in the mobile station and then in the system.

Although the COUNT variable makes available independent information at both the mobile and the system, transmitting the COUNT directly from the mobile to the system at system access is undesirable because to do so would require modifying the air interface specification of information of existing systems, e.g., by adding an eight bit COUNT field. Moreover, if transmitted directly, this information would be available to a prospective fraudulent user. Thus, according to exemplary embodiments of the present invention, the value of the COUNT variable is instead transmitted from the mobile indirectly as discussed below.

As described above, some conventional systems currently transmit the MIN, ESN, and B-number (a destination identifier) over the air interface. To preserve an already standardized air interface specification, the ESN can be modified to include information about the current value of the COUNT variable of the mobile immediately prior to system access. This modified electronic serial number (MESN) will have the same bit length, e.g., 32 bits, as the original ESN as seen in FIG. 3.

Therein, the ESN 20, the COUNT 22, a personal identification number (PIN) 24, and a B-number 26 are all input to an encoder 28 that outputs the MESN 29 using an algorithm. Conventional algorithms can be used, preferably so-called "clever one-way" algorithms which will not allow a prospective fraudulent user to count backwards from the MESN to determine the ESN and COUNT.

Figure 3:
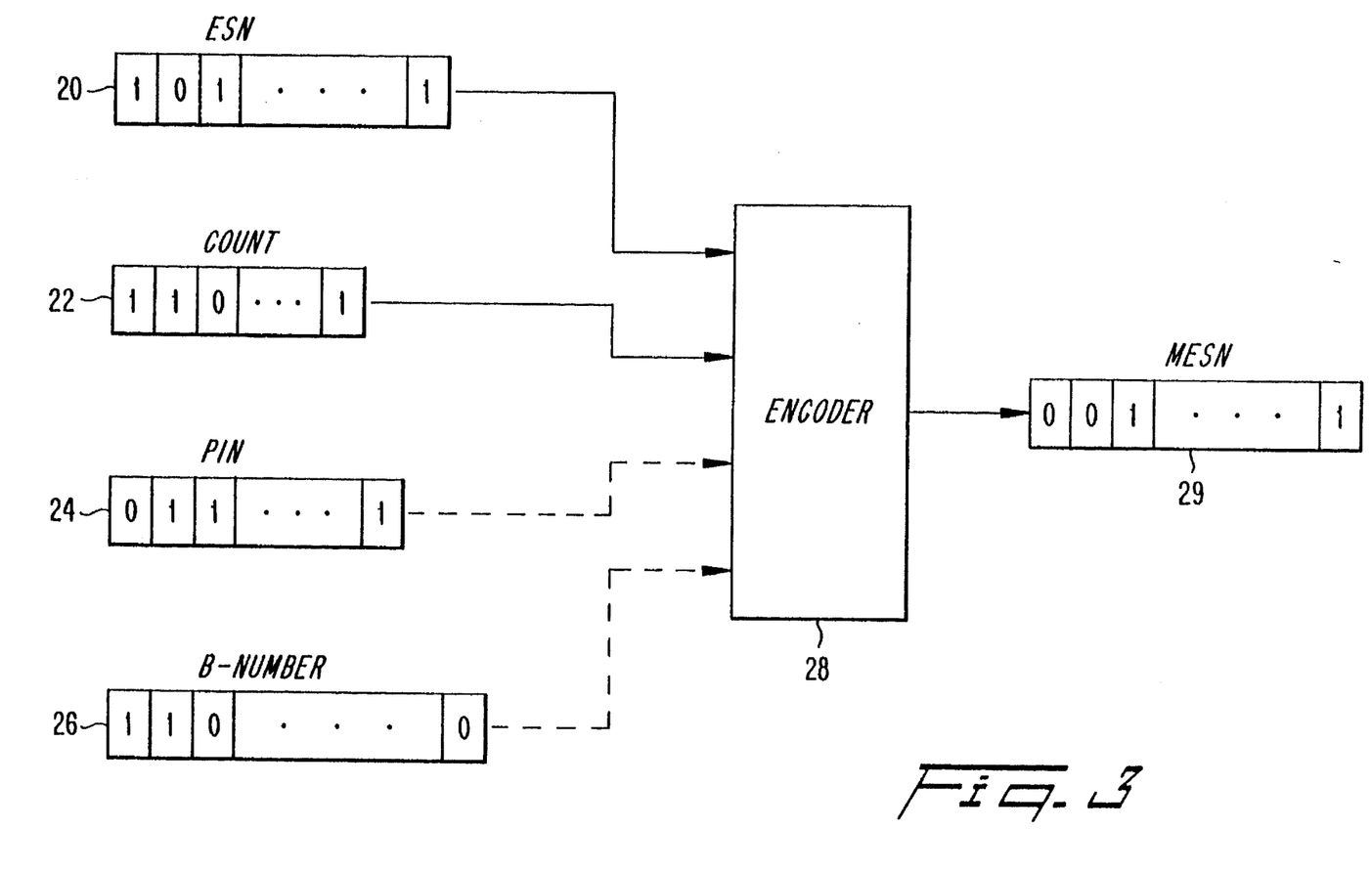
FIG. 3 is a block diagram illustrating the encoding of a modified electronic serial number according to an exemplary embodiment of the present invention.

Although a PIN and B-number field are shown in FIG. 3 being input to the encoder, those skilled in the art will appreciate that these variables need not be input, or that, alternately, additional variables known to both the mobile and the system could be used. Note that in this exemplary embodiment, the MESN has the same bit length as the ESN.

Thus, the $MESN_m$, $MIN_m$, and B-number are then transmitted to the system for authentication. The authentication process according to this exemplary embodiment will now be described with reference to the flowchart of FIG. 4.

Figure 4:
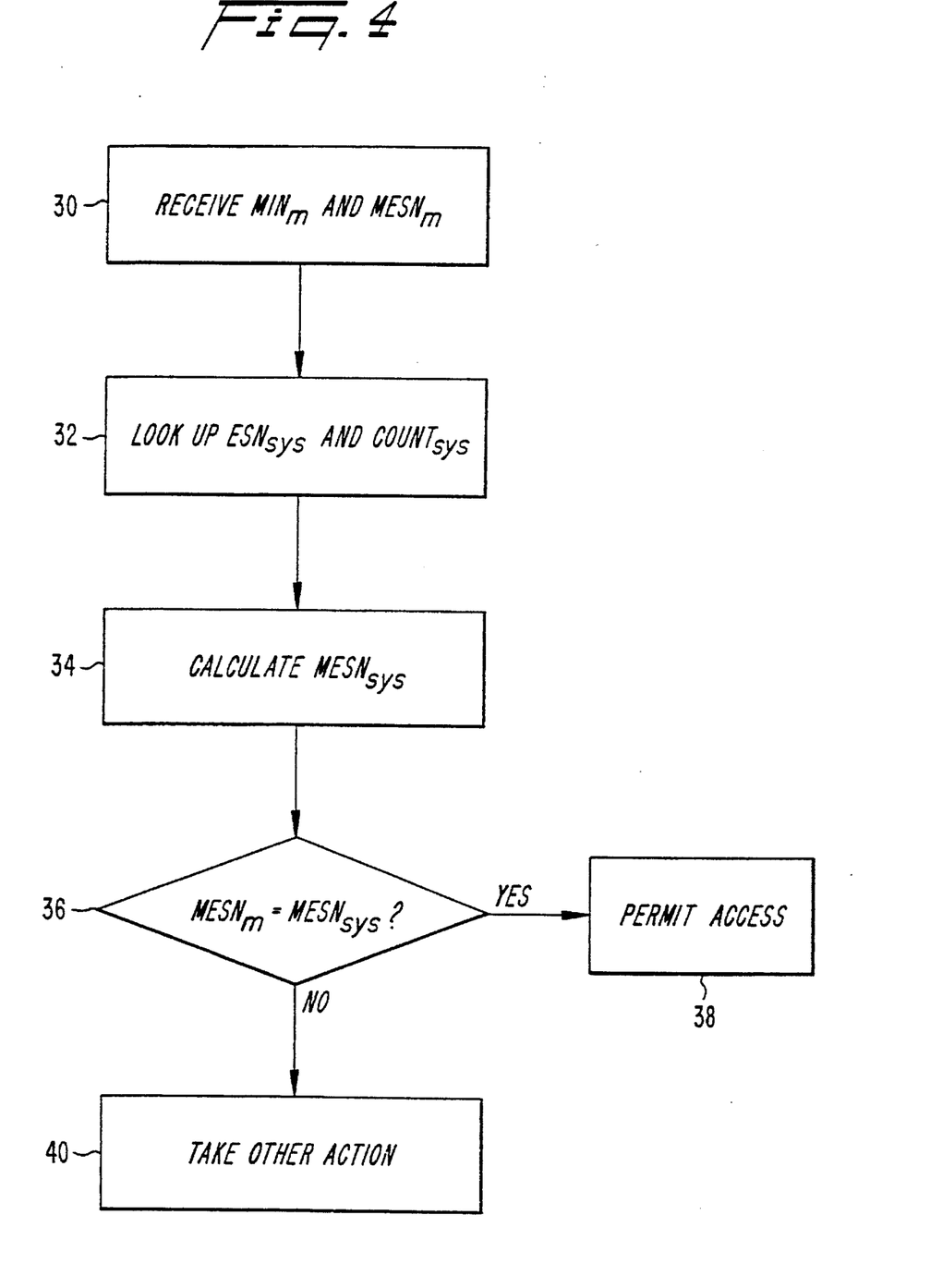
FIG. 4 is a flowchart illustrating an identification authentication method according to an exemplary embodiment of the present invention.

The $MIN_m$ received by the system at 30 is used to look up the corresponding $ESN_{sys}$ and $COUNT_{sys}$ in a subscriber register at block 32. $ESN_{sys}$ and $COUNT_{sys}$ (and, optionally, other variables such as the PIN and B-number) are then used to calculate $MESN_{sys}$ using the same algorithm used by the mobile station at block 34. $MESN_{sys}$ and $MESN_m$ are compared at 36 and access is permitted if the two are the same in block 38. Otherwise, some other action is taken at block 40 as described further, below.

The above-described exemplary methods and systems for authenticating mobile station identification can, as earlier mentioned, result in the $MESN_{sys}$ not being equal to $MESN_m$. This result does not necessarily indicate fraud. If the event for updating the COUNT is chosen as mentioned earlier, this result can also be the result of a signalling interruption. One way in which the system can check this possibility is by incrementing $COUNT_{sys}$ by one, calculating a new $MESN_{sys}$, and thereafter comparing the new $MESN_{sys}$ with $MESN_m$. If they are equal then access can be permitted, otherwise the call is disconnected because it is likely that a fraudulent user with the same MIN is trying to make access. Appropriate action is then taken by the system operator.

By the use of a COUNT it is also possible to detect whether two identical mobiles, call them mobile A and mobile B, exist in the system at the same time. This is not possible using the challenge response method. Assume, for example, that mobile A has made one or several accesses to the system and thereby incremented the COUNT in the system (and in mobile A). If mobile B thereafter tries to access the system the $MESN_m$ will not be equal to $MESN_{sys}$. In this way, fraudulent use can be detected. Exemplary embodiments of a mobile unit and a base station will now be described in conjunction with FIGS. 5 and 6, respectively.

Figure 5:
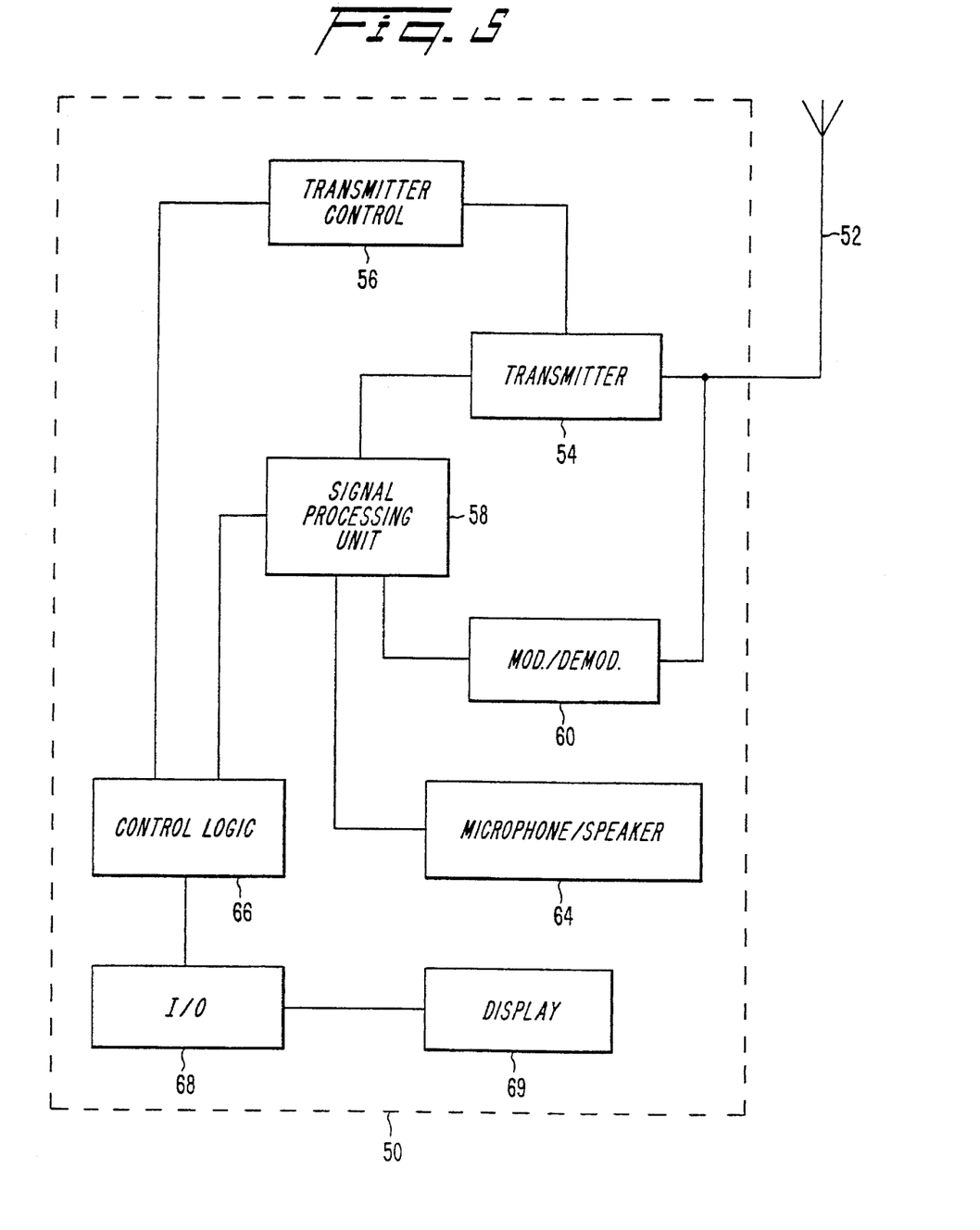
FIG. 5 is a block diagram of an exemplary mobile station according to the present invention.

In FIG. 5, the mobile station 50 has an antenna 52. A transmitter 54 is connected to the antenna 52 and is controlled by a transmitter control unit 56 which, among other functions, is able to effect the authentication in conjunction with control logic 66. The transmitter is also connected to a signal processing unit 58. A receiver 60 is also connected to the antenna and is used in time multiplex together with the transmitter 54. The receiver 60 is also connected to the signal processing unit 58. Radio equipment for modulating, demodulating and equalizing purposes is included in the blocks 54 and 60. The signal processing unit 58 includes, for example, circuitry for channel coding, channel decoding and signal processing of incoming and outgoing speech. The signal processing unit 58 is also connected to a microphone and speaker in block 64, and to control logic 66. In turn, the control logic 66 is connected to the transmitter control unit 56 and to I/O-block 68 which processes the I/O signals from a keyboard (not shown) and to a display 69.

Figure 6:
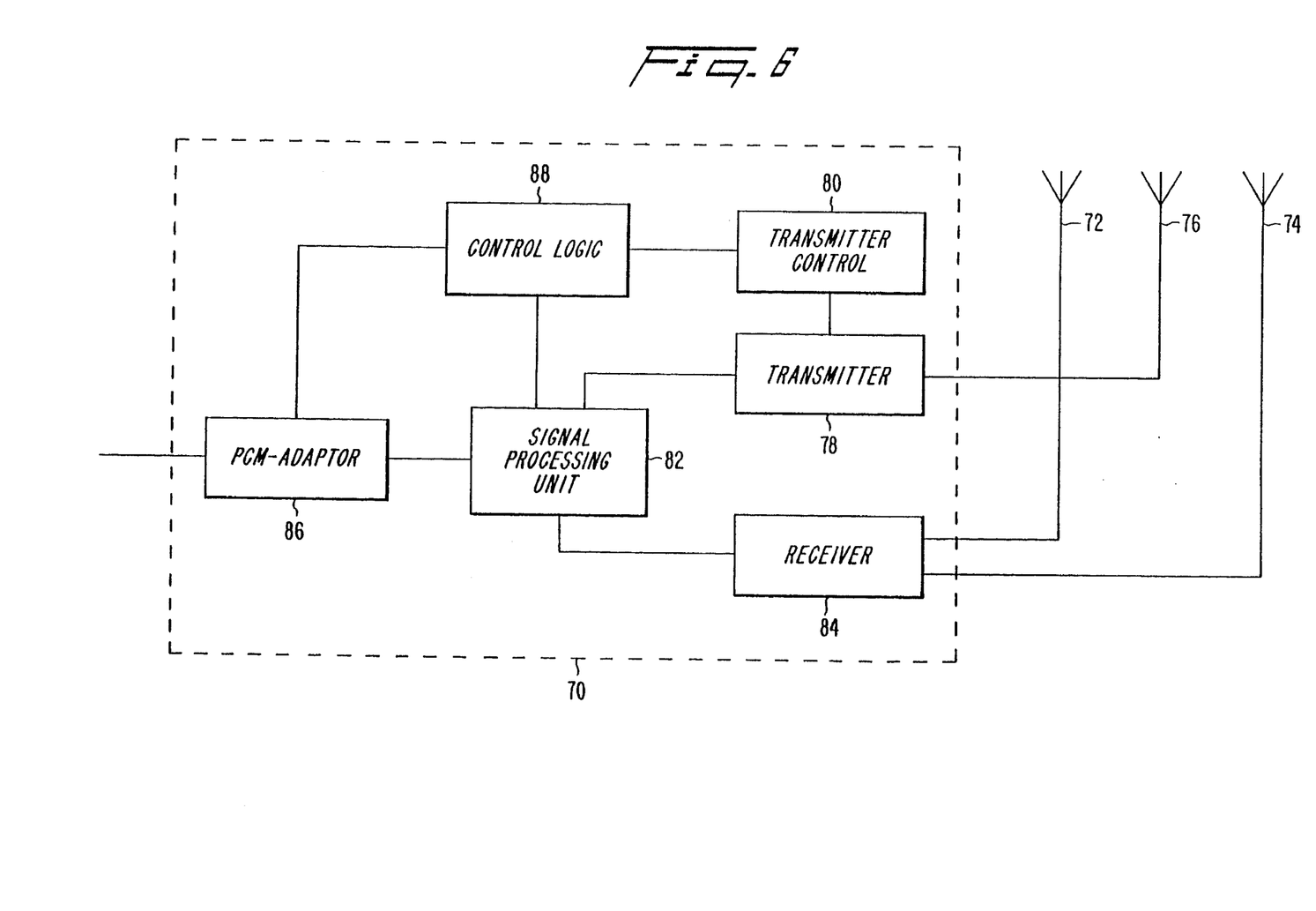
FIG. 6 is a block diagram of an exemplary base station according to the present invention.

FIG. 6 is a block diagram illustrating an exemplary base station. Although the block diagram of FIG. 6, is illustrated as a single system, those skilled in the art will readily appreciate that the hardware shown in FIG. 6 can also be distributed over several units, for instance over a base station and a base station controller.

The base station, generally referred to by reference numeral 70, has three antennas, of which two, 72 and 74, are used for receiving signals, whereas only one antenna 76, is used to transmit signals. A transmitter 78 is connected to the antenna 76 and is controlled by a transmitter control unit 80. The transmitter 78 is also connected to the signal processing unit 82. A receiver 84 is also connected to the antennas 72 and 74 and the signal processing unit 82. Radio equipment for modulating and demodulating and equalizing purposes is included in the blocks 78 and 84. The signal processor unit 82 provides for channel coding and decoding and processing speech in the incoming and outgoing directions. The signal processor unit 82 is also connected to the PCM-link adaptor block 86 and to the control logic 88. In turn, the control logic 88 is connected to the transmitter control unit 80.

The authentication procedures described above can be implemented, for example, as a program sequence in the control logic 66 and 88 of the mobile and base stations, respectively, using a microprocessor (not shown). The microprocessor in the base station can calculate the $MESN_{sys}$ based on the received information and at least the $ESN_{sys}$ and the $COUNT_{sys}$ stored in, for example, a RAM (also not shown).

Figure 7:
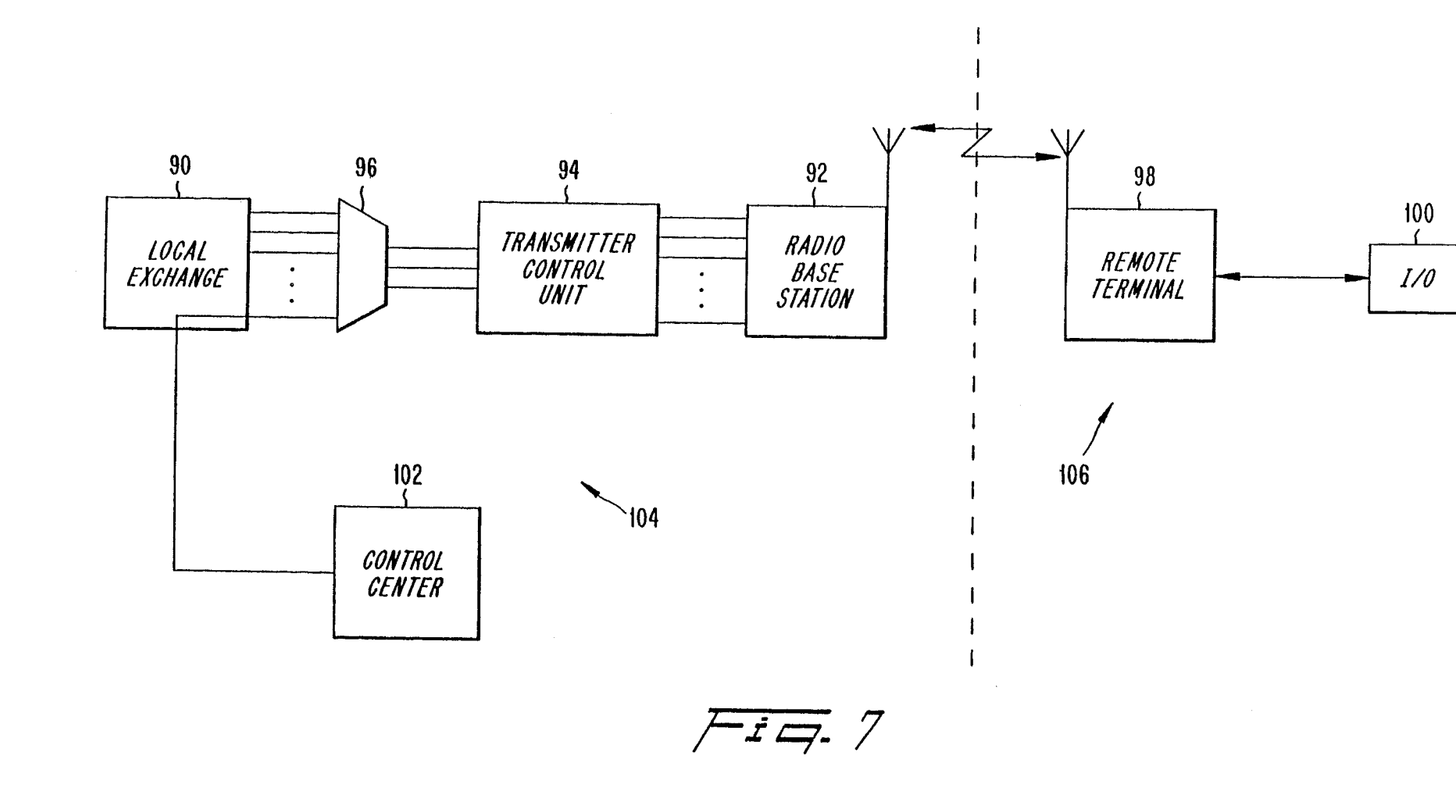
FIG. 7 is a block diagram of an exemplary RLL implementation of the present invention.

In addition to conventional radiocommunication systems in general, the present invention can also be applied to radio local loop (RLL) applications. An exemplary RLL application is illustrated in FIG. 7. In an RLL system, a group of fixed public switched telephone network (PSTN) subscribers located in a defined geographical area, e.g., 1 to 100 kilometers in diameter, share connections each comprising, for example, a wire-bound segment and a radio-bound segment in series. Alternately, some of the connections can be purely wire-bound or purely radio-bound while some of the connections are hybrids.

FIG. 7 illustrates how these hybrid connections can be implemented. A local exchange 90 is connected to a radio base station 92 through a translation control unit 94. The translation control unit 94 and, on the other end, a line concentrator 96, allow the number of physical lines connecting these two units to be reduced over much of the distance between the local exchange 90 and the radio base station 92. Thus, the line concentrator 96 transforms, for example, a hundred terminals worth of input to output signals which can be carried over thirty twisted pair cables. The translation control unit 94 transforms the signals sent over the thirty twisted pair cables back into their respective terminals for input into the radio base station 92. The radio base station 92 can, for example, provide radio channels using any conventional radio communication system, e.g., FDMA, TDMA or CDMA. In FIG. 7, a remote terminal 98 for receiving the signal transmitted over a radio channel from the radio base station 92, is shown as being connected to an I/O device 100 (e.g., a telephone or a fax machine) via an adaptor. An adaptor (not shown), if necessary, can provide an interface between a four wire output port of the remote terminal 98 and a two wire input port of the I/O device 100 for speech or data which can be then connected to a telephone or a fax terminal. The control center 102 receives and sends information via the local exchange to and from translation control units for administration of the authentication procedure, e.g., resetting counters, etc.

On the network side 104 the counter and authentication control can be implemented in the translation control unit 94. On the remote terminal side 106, the counter and authentication control can be implemented using control software stored in a memory device (not shown) of the remote terminal 98. At installation, the counter in both the remote terminal 98 and the network 104, can be reset to the same value, which also will be stored as the 'reset value' at both sides. Some type of conventional functionality for resetting the counter in case of system failure or fraud can also be provided. For example, at the remote terminal 98, the subscriber can reset the counter by using a keypad (not shown) and a special key sequence. On the network side, the control center 102 can be responsible for reset of COUNT.

Thus, according to exemplary embodiments of the present invention a modified serial number MESN that has the same format as a standard serial number ESN is determined using a COUNT. The COUNT is not transmitted directly over the air interface, making fraud very difficult and resulting in disparity between COUNTS if fraud should occur. The COUNT is updated as a result of a signalling event so that no extra signals are needed over the air interface. The events which update the COUNT can, for example, be selected so that the COUNT in the mobile is incremented in the mobile first and in the system second, so that fraud can be distinguished from signal interruption.

While the present invention has been described in terms of the foregoing exemplary embodiments, those embodiments are considered in all respects to be illustrative, rather than limitive, of the present invention. For example, although the exemplary embodiments have been described in terms of counters which supply the value of the COUNT parameter, those skilled in the art will readily appreciate that any device or method which provides comparable, incremental values in the remote station and the system can be used. Thus, instead of counters, a list of indexed random numbers could be supplied to both the remote station and the system. Upon the occurrence of a predetermined event, a pointer can be incremented to point at the next random number in both the mobile list and the system list and this value can be used as the COUNT.

Further, while these exemplary embodiments have been described in terms of using a modified version of the ESN for authentication, those skilled in the art will appreciate that modified versions of any redundant data fields may be used which form part of an air interface, e.g., cyclic redundancy check (CRC) fields. Accordingly, the scope of the present invention is set forth in the appended claims and any and all modifications and equivalents thereof within the spirit of the present invention are intended to be encompassed thereby.

What is claimed is:

1. A method for authenticating an identification of a remote station in a radiocommunication system comprising the steps of:

incrementing a first value stored in said remote station in response to each occurrence of at least one predetermined event;

calculating in the remote station a first modified value of an identification code of said remote station known to said remote station and to said system using said first value as an input;

incrementing a second value stored in said system in response to said each occurrence of at least one predetermined event;

calculating, in said system, a second modified value of said identification code of said remote station known to said remote station and to said system by using said second value as an input;

transmitting said first modified value from said remote station to said system, and comparing said first modified value to said second modified value to authenticate identification of said remote station.

2. A method for authenticating an identification of a remote station in a radiocommunication system comprising the steps of:

incrementing a first value stored in said remote station in response to each occurrence of at least one predetermined event;

incrementing a second value stored in said system in response to said each occurrence of at least one predetermined event; and using said first and second values to authenticate identification of said remote station by indirectly transmitting said first value to said system via modification of redundant information.

3. The method of claim 2 further comprising the steps of:

determining, in said remote station, a first modified identification number based on at least said first value and an original identification number, and transmitting said first modified identification number to said system.

4. The method of claim 3, wherein said step of determining further comprises the step of:

determining said first modified identification number also based on at least one of: a PIN and a B-number.

5. The method of claim 3, wherein said first modified identification number has a same number of bits as said original identification number.

6. The method of claim 2, wherein said first value is incremented before said second value is incremented.

7. The method of claim 2, wherein said at least one predetermined event comprises at least one of: traffic channel assignment, an origination signal, registration, beginning to transmit, receiving and looping back of a SAT tone and an on-hook signal.

8. The method of claim 3 further comprising the steps of:

after receiving said first modified identification number from said remote station, determining, in said system, a second modified identification number based on at least said second value and an original identification number, and comparing said first and said second modified identification numbers to authenticate identification of said remote station.

9. The method of claim 2, wherein the redundant information comprises information used for purposes other than encryption.

10. The method of claim 2, wherein the redundant information comprises a CRC field.

11. A system for authenticating identification of a remote station in a radiocommunication network comprising:

means, disposed in said remote station, for incrementing a first value stored in said remote station in response to each occurrence of at least one predetermined event;

means, disposed in said network, for incrementing a second value stored in said network in response to said each occurrence of at least one predetermined event; and means, disposed in said network, for using said first and second values to authenticate identification of said remote station by indirectly receiving said first value from said remote station via modification of redundant information.

12. The system of claim 11, further comprising:

means, disposed in said remote station, for determining a first modified identification number based on at least said first value and an original identification number, and means, disposed in said remote station, for transmitting said first modified identification number to said network.

13. The system of claim 12, wherein said means for determining is also for determining said first modified identification number based on at least one of a PIN and a B-number.

14. The system of claim 12, wherein said first modified identification number has a same number of bits as said original identification number.

15. The system of claim 12, further comprising:

means, disposed in said network, for receiving said first modified identification number from said remote station;

means, disposed in said network, for determining a second modified identification number based on at least said second value and an original identification number, and means, disposed in said network, for comparing said first and said second modified identification numbers to authenticate identification of said remote station.

16. The system of claim 11, wherein said means for incrementing said first value operates before said means for incrementing said second value in response to said each occurrence of at least one predetermined event.

17. The system of claim 11, wherein said at least one predetermined event comprises at least one of: traffic channel assignment, an origination signal, registration, beginning to transmit, receiving and looping back of a SAT tone and an on-hook signal.

18. The system of claim 11, wherein the redundant information comprises identification number of the remote station used for purposes other than encryption.

19. The system of claim 11, wherein the redundant information comprises a CRC field.

20. A remote station for communicating with a radiocommunication system comprising:

a memory in which a value is stored;

a counter to increment said stored value in response to each occurrence of at least one predetermined event;

a processor for modifying an original identification number associated with said remote station based on said stored value to generate a modified identification number; and a transmitter which transmits a signal including said modified identification number but not said stored value.

21. A base station for communicating with a remote station in a radiocommunication system comprising:

a memory in which a count value and a subscriber identification number is stored;

a counter to increment said count value in response to each occurrence of at least one predetermined event;

a receiver for receiving a signal from said remote station including a modified identification number; and processing means for retrieving an identification number from said memory which corresponds to the remote station, determining an expected modified identification number using said retrieved identification number and said count value, and authenticating an identification of said remote station using at least said expected modified identification number.

22. The base station of claim 21 wherein said processing means is also for comparing said expected modified identification number with said received modified identification number.

23. The method of claim 1, wherein said first value is used as a key to encrypt said identification code.

24. The method of claim 2, wherein said first value is used as a key to encrypt said redundant information.

25. The system of claim 9, wherein said first value is used as a key to encrypt said redundant information.

26. The remote station of claim 16, wherein said stored value is used as a key to encrypt said original identification number.

27. The base station of claim 17, wherein said count value is used to decrypt said received modified identification number.

* * * * *